United States Patent Office 2,818,727
Patented Jan. 7, 1958

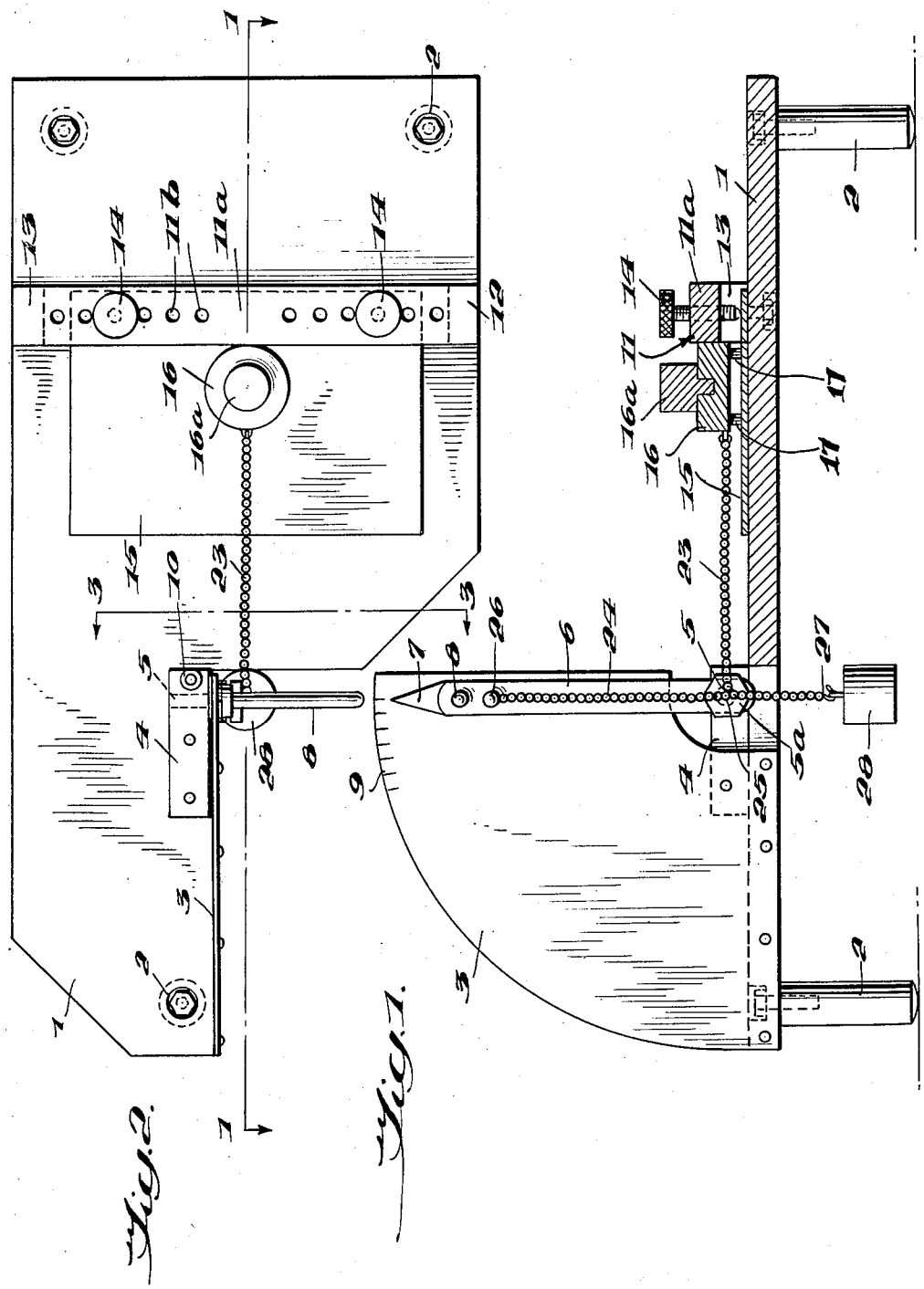

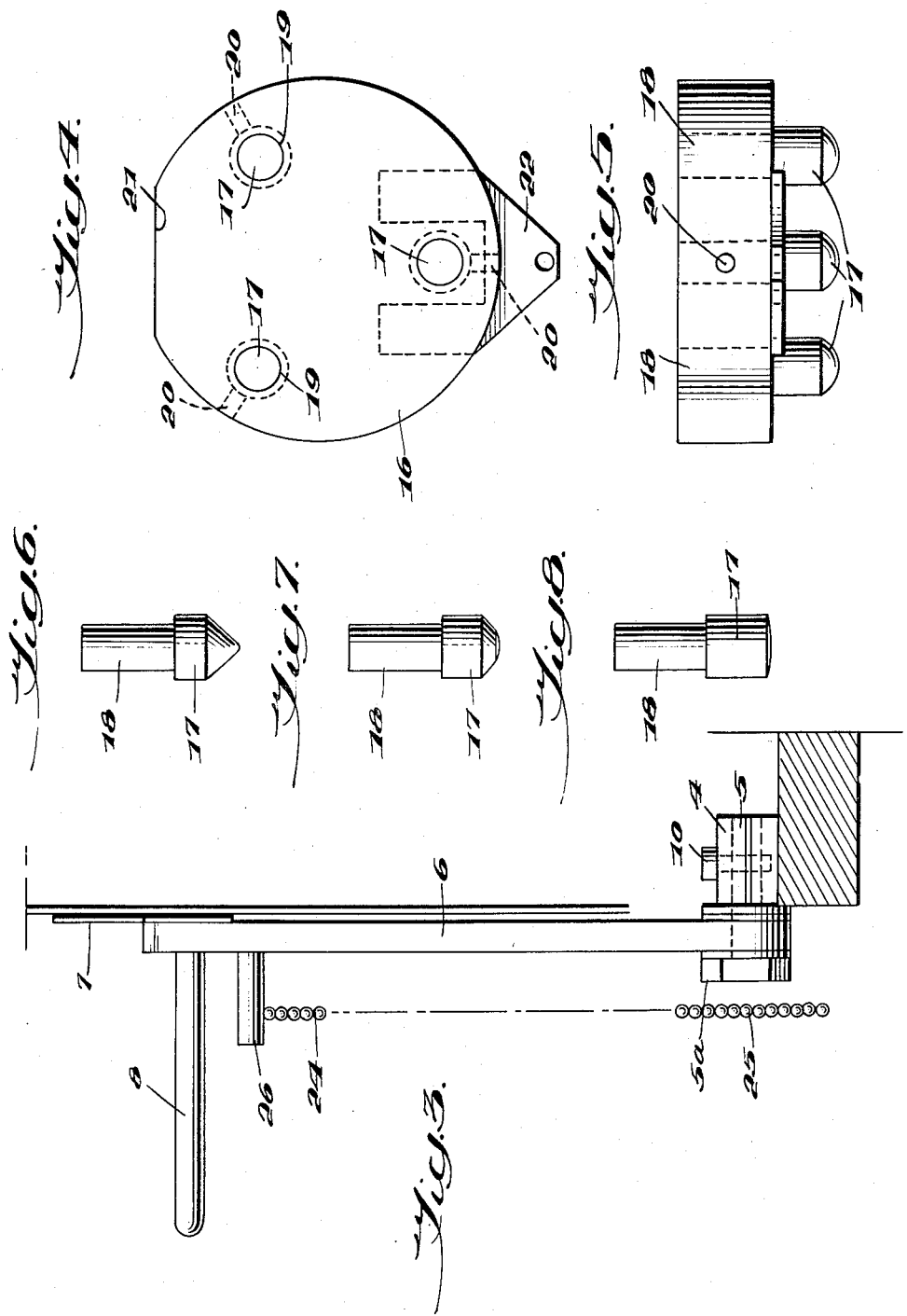

2,818,727
HARDNESS TESTING APPARATUS

Maynard R. Euverard, Short Hills, N. J.

Application April 25, 1956, Serial No. 580,535

2 Claims. (Cl. 73—78)

This invention relates generally to a surface hardness testing apparatus, and more particularly, to a testing apparatus which will measure various surface qualities by means of a plurality of spherical segment surfaces deforming the test surface.

It is well known in the testing art to determine the degree of surface hardness by means of the so-called "scratch test" in which a tool with a sharp point, such as a diamond, is moved across the test surface under various loads with observations being taken of the resistance of the surface to said scratching.

My invention relates to a testing apparatus which utilizes the principle that the resistance to sliding of an object over a surface is related to the degree of deformation of the surface caused by the object thereon. As an analogous example of my invention a steel ball may be considered to rest on a foam rubber surface. The ball will sink into the foam rubber and will have a large area of contact with a low pressure per unit area. If the ball is placed on a substance such as "tar" the distance it will sink and the resulting area of contact is a function of time. If the ball is placed on a substance such as plate glass, the pressure per unit area exerted by the ball on the glass is very great due to the very small area of contact.

The force required to slide the steel ball on plate glass is relatively low since friction only has to be overcome; i. e., the ball does not have to be elevated against gravity since it does not penetrate the glass. In the case of the ball on foam rubber, not only does friction have to be overcome but the ball must either be elevated against gravity or plow a furrow in the rubber. The same is true in the case of tar.

The instant invention functions on the same principle except on a very much reduced scale, necessitated by the very thin materials it is designed to evaluate. Therefore the method for measuring the force required to start a sliding motion must be very sensitive.

The primary object of my invention is to provide an apparatus for testing the surface qualities of a material without the cutting or removal of a portion of the specimen by measuring the resistance to sliding as an indication of the degree of surface deformation.

Another object of my invention is to provide an apparatus which measures the degree of indentation on a test surface by the lateral force required to lift the testing element from the indentation or to deform the specimen in the direction of the applied force.

Still another object of my invention is to provide an apparatus having weight and chain means for applying the required lateral force to the deforming object free from friction and to provide sensitive means for indicating that force.

A further object of my invention is to provide an apparatus for measuring surface qualities by the use of a deformation body having spherical segment members cooperating with the test surface.

Still another object of my invention is to provide an apparatus similar to that described above which is adaptable for the measurement of surface hardness, cold flow, and drying time.

Other objects and advantages of my invention will become more apparent from a study of the following specification when considered in conjunction with the accompanying drawings in which:

Fig. 1 is a longitudinal sectional view of the hardness tester taken through line 1—1 of Fig. 2;
Fig. 2 is a plan view of my invention;
Fig. 3 is a transverse sectional view of the invention taken through line 3—3 of Fig. 2;
Fig. 4 is a plan view of the deformation body;
Fig. 5 is an elevational view of the deformation body; and
Figs. 6, 7 and 8 show various deformation tip embodiments.

Referring now to Figs. 1, 2 and 3, a base plate 1 is supported by legs 2 and carries a vertical scale plate 3 and a lever block 4 rigidly secured thereto. Rotatably mounted in lever block 4 transverse to the plane of scale plate 3 is a shaft 5 to which is secured an operating lever 6 having a pointer 7 and an operating handle 8 at the upper extremity thereof. Pointer 7 cooperates with graduations 9 in the scale plate 3 to give an indication of the angular position of operating lever 6 about the longitudinal axis of shaft 5. Locking bolt 10 threaded into the lever block 4 provides means for adjusting the freedom of rotation of shaft 5 in lever block 4. Shaft 5 has an enlarged head 5a which carries calibrating indicia as will be explained below.

Rigidly secured to the base plate 1 transverse to its longitudinal axis is a cross bar shown generally at 11 having at each end depending portions 12 and 13 which serve to raise the central portions 11a of the cross bar a certain distance above the base plate 1 as shown in Fig. 1. Threadably movable in holes 11b in the cross bar 11 are a plurality of sample locking bolts 14 which function to securely fasten the test sample 15 to the base plate 1.

Resting upon the test sample 15 is a deformation body 16 having deformation tips 17 which cooperate with the surface of the test sample. The deformation tips are formed from stainless steel or other suitable durable material and, as shown in Figs. 4 and 5, have shank portions 18 which extend into bores 19 in the deformation body. By means of set screws 20 the deformation tips may be removably secured within bores 19. The deformation body has a flat rear surface 21 which is adjacent cross bar 11 when the instrument is at its initial position upon commencing test. Secured to the front portion of deformation body 16 is a chain anchor plate 22 which provides means for connecting actuator chain 23 to the body. The upper surface of deformation body 16 is flat and is adapted to support auxiliary loading weight 16a placed thereon.

As seen in Fig. 1 the actuator chain 23 is substantially horizontal and is secured at its other end to the vertical weight chain 24 at junction 25. The chain should be of strong, lightweight material which maintains constant chain dimensions under variations of load and temperature. At its upper extremity vertical weight chain 24 is secured to pin 26 on operating lever 6, and at its free end 27, means are provided for removably connecting weight member 28. As will be apparent from Fig. 1, counter clockwise movement of the operating lever 6 by handle means 8 causes weight member 28 to move downwardly to the left resulting in movement of actuating chain 23 and deformation body 16 to the left. As will be explained below, in testing operation the lever 6 is moved by operating handle 8 until the deformation body 16 just begins to move. An indication of the position of lever 6 at that instant is presented by pointer 7 on scale 9.

Figs. 6, 7 and 8 disclose three embodiments of deformation tips. The tips are made of stainless steel material and have smooth, spherical-segment lower extremities which cooperate with the test sample. In the embodiment shown in Fig. 6 the tip radius might be on the order of 0.02 inch, in Fig. 7, 0.2 inch, and in Fig. 8, 2.0 inches.

In operation, the test sample 15 is secured to the base plate 1 under cross bar 11 by means of the locking bolts 14. The proper embodiment of deformation tips is selected according to the material to be tested and the tips are secured in the deformation body by means of the set screws 20. The deformation body is placed on the test sample with its flat rear surface 21 adjacent the cross bar 11. The lengths of chains 23 and 24 are adjusted so that junction 25 is opposite that indicia on shaft head 5a which is at the same elevation as the connection of actuating chain 23 to the deformation body.

The operating lever 6 is rotated counterclockwise at a slow steady rate until forward motion of the deformation body is detected. This is the end of the test operation. Recordings are made of the scale reading, the sample thickness, the value of penetrator weight 16a, and the value of weight 28.

Inherent in the design of the apparatus is increased loading per unit area as a function of increase in test surface hardness. Equilibrium will be reached on most surfaces where the loading per unit area is in balance with the firmness of the surface. Table I shows the relationship between surface loading per unit area and depth of surface penetration for the deformation tip embodiments of Figs. 6, 7 and 8.

*Table No. I*

| Surface Deformation in Mils | Kilogram Loading per Sq. Cm. per Deformation Tip for 100 gram Deformation Body | | |
| --- | --- | --- | --- |
| | Fig. 6 | Fig. 7 | Fig. 8 |
| 0.1 | 410 | 41.0 | 4.10 |
| 0.2 | 206 | 20.6 | 2.06 |
| 0.3 | 137 | 13.7 | 1.37 |
| 0.4 | 98.0 | 9.80 | .980 |
| 0.6 | 69.8 | 6.89 | .689 |
| 0.8 | 52.2 | 5.18 | .515 |
| 1.0 | 42.4 | 4.15 | .412 |
| 1.5 | 28.8 | 2.75 | .274 |
| 2.0 | 21.6 | 2.09 | .207 |
| 2.5 | 17.6 | 1.66 | .165 |
| 3.0 | 14.8 | 1.39 | .137 |
| 4.0 | 10.9 | .99 | .098 |
| 5.0 | 9.4 | .84 | |

The apparatus is designed primarily for testing protective and decorative coatings where the degree of penetration would not exceed 0.005 inch. It will work equally well, however, on such surfaces as floor and wall coverings and other materials such as leather and plastics by choosing the proper deformation tips and deformation load. To insure accurate comparative results, measurement should be made on test samples of similar thickness.

The scale 9 reads directly in grams pull on the deformation body when normal operating weight 28 (such as 100 grams) is used. If a smaller weight (20 grams) is used to obtain greater accuracy at lower values, the scale reading would be divided by five. Similarly, by use of auxiliary weights 16a on the deformation body the values shown in Table I can be increased by factors of 2, 3 and 4.

The firmness of a coating changes continuously during the drying process and consequently drying time may be evaluated by using the apparatus and making measurements at intervals during the drying process.

Similarly, cold flow exhibited by many materials when placed under stress may be measured by measuring the time interval between placing the deformation body on the test sample and start of rotation of the operating lever.

Thus it is apparent that my invention provides an inexpensive accurate, and sensitive surface quality indicating device utilizing the resistance to sliding of a body having spherical segment surfaces which cause a certain degree of deformation of said test surface.

While in accordance with the provisions of the statutes I have illustrated and described the best form of embodiment of my invention known to me, it will be apparent to those skilled in the art that changes may be made in the form of the apparatus described without departing from the scope of my invention as set forth in the appended claims.

I claim:

1. Apparatus for testing the surface qualities of an impressionable test specimen having a flat surface comprising a test frame; means for securing said test specimen to said frame with its flat surface in a horizontal plane; a deformation body, said body having depending supporting portions with spherical segment surfaces at the lower extremities thereof, said spherical segment surfaces contacting said specimen surface to support said deformation body thereon and to cause a degree of surface deformation thereof; means for applying a lateral force to said deformation body tending to cause lateral movement thereof, said force applying means comprising a substantially vertical operating lever pivotally secured at its lower end to said test frame and movable in a vertical plane through the longitudinal axis of said frame, a weight chain secured at its upper extremity to the upper end of said operating lever and hanging freely therefrom, a weight secured to the lower extremity of said weight chain, and an actuating chain secured at one end to said deformation body and at the other end to said weight chain intermediate its extremities at a junction point of substantially the same elevation as said chain connection to said deformation body, whereby upon pivotal movement of said operating lever in a direction away from said deformation body, a force is transmitted to said deformation body through said actuating chain tending to cause movement of said deformation body toward said operating lever; and means for indicating the lateral force required to be applied to said deformation body to cause commencement of lateral movement thereof.

2. Apparatus for testing the surface qualities of an impressionable test specimen as defined in claim 1 wherein said indicating means comprise a scale plate secured to said test frame parallel to said vertical plane of movement of said operating lever and a pointer secured to said operating lever and cooperating with said scale plate.

References Cited in the file of this patent

UNITED STATES PATENTS 1,935,752    Sward _____ Nov. 21, 1933

FOREIGN PATENTS 6,622    Great Britain _____ A. D. 1913

OTHER REFERENCES

Am. Jour. of Physics, vol. 24, No. 3, pp. 174 and 175, March 1956.